May 24, 1966  G. CHIEGER ETAL  3,252,715
KINGPIN CONSTRUCTION
Filed Jan. 8, 1964
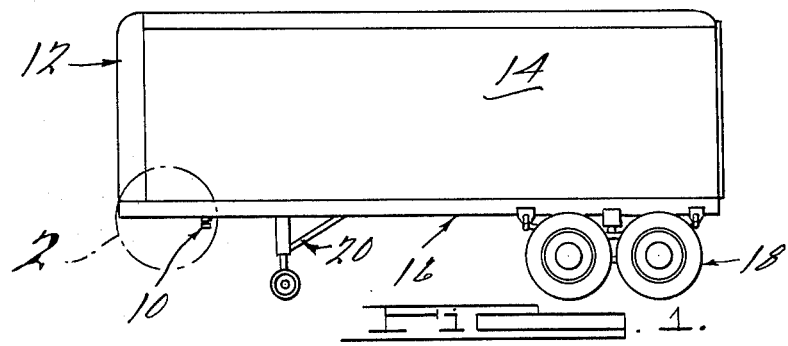
FIG. 1.
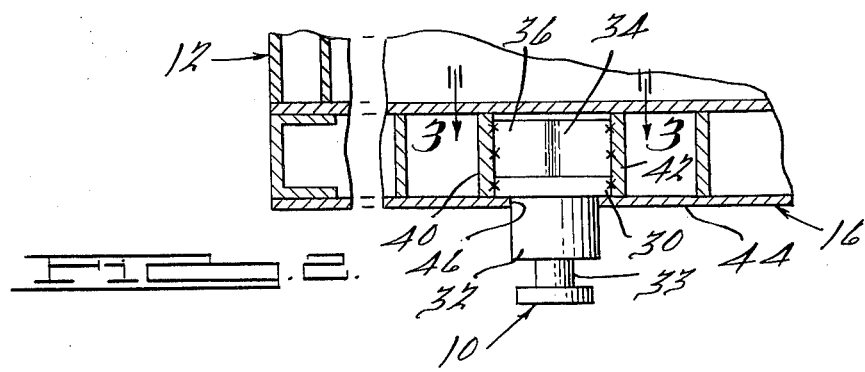
FIG. 2.
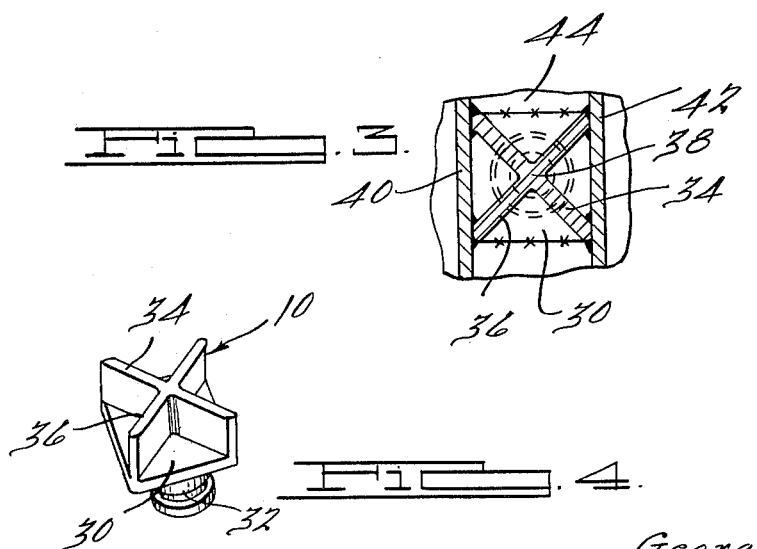
FIG. 3.
FIG. 4.
INVENTORS.
George Chieger
Eugene Chosy
BY Harness, Dickey & Pierce
ATTORNEYS.

United States Patent Office 3,252,715
Patented May 24, 1966

3,252,715
KINGPIN CONSTRUCTION
George Chieger, Birmingham, and Eugene Chosy, Grosse Pointe Farms, Mich., assignors to Fruehauf Corporation, Detroit, Mich., a corporation of Michigan
Filed Jan. 8, 1964, Ser. No. 336,588
2 Claims. (Cl. 280—433)

This invention relates generally to heavy duty over-the-road semitrailers, and more particularly to an improved kingpin construction for such semitrailers.

One component of over-the-road semitrailers which must sustain relatively severe loads is the kingpin for transmitting tractive effort between a tractor and the semitrailer. Kingpins heretofore known and used often utilize a relatively heavy box construction from which the kingpin depends. However, in such known constructions, loads on the cylindrical portion of the kingpin are transferred to what may be termed a thin plate or diaphragm which is inherently incapable of accepting large bending moments. Furthermore, kingpins of known constructions are generally required to be cast as opposed to a steel forging.

Accordingly, one object of the instant invention is an improved kingpin construction.

Another object is a kingpin construction of maximum strength to weight ratio.

Another object is a kingpin construction that maximizes the weld area between the kingpin structure and the structural members of a trailer.

Another object is a kingpin capable of handling relatively large bending moments acting thereupon.

Another object is a kingpin that lends itself to forging.

Other objects and advantages of the instant invention will be apparent in the following specification, claims and drawings, wherein:

FIGURE 1 is a side elevational view of a heavy duty over-the-road semitrailer having the kingpin construction of the instant invention;

FIG. 2 is a view taken within the circle 2 of FIGURE 1 and partially broken away for clarity;

FIG. 3 is a cross sectional view taken substantially along the line 3—3 of FIGURE 2; and FIG. 4 is a fragmentary perspective view of the kingpin removed from the trailer.

As seen in FIGURE 1 of the drawings, a kingpin 10, in accordance with an exemplary constructed embodiment of the instant invention, is shown in operative association with a heavy duty over-the-road semitrailer 12. The trailer 12 is of conventional construction comprising a van 14, chassis 16, wheel suspension 18 and landing gear 20.

As best seen in FIGURE 2 of the drawings, the kingpin 10 comprises a steel forging having a generally flat plate portion 30 of rectangular horizontal configuration from which a cylindrical pin portion 32 depends. The pin portion 32 has an annular groove 33 thereon to facilitate coupling to a complementary fifth wheel of a tractor (not shown).

In accordance with one feature of the instant invention, the kingpin 10 has a pair of intersecting ribs 34 and 36 orientated in what may be termed "maltese cross" configuration and extending upwardly from the plate portion 30 thereof. The intersection of the ribs 34 and 36 results in a column 38 of metal vertically aligned with the pin portion 32. Thus, bending loads on the pin portion 32 are transferred through the vertical column 38 at the intersection of the ribs 34 and 36 to the ribs 34 and 36, minimizing flexure of the plate portion 30.

In accordance with another feature of the instant invention, the ribs 34 and 36 maximize the total length of the vertical weld junctures defined by opposite ends thereof and the adjacent longitudinally spaced transverse members 40 and 42 of the chassis 16 of the trailer 12. In other words a pair of weld junctures are provided at each end of the ribs 34 and 36. The plate portion 30 of the kingpin 10, which is seated on a lower plate 44 of the chassis 16, provides additional horizontal weld junctures on opposite sides thereof, the cylindrical portion 32 of the kingpin 10 extending through a complementary aperture 46 in the plate 44.

In accordance with yet another feature of the instant invention, the herein disclosed "maltese cross" configuration lends itself to forging which results in an optimum grain orientation.

From the foregoing description, it should be apparent that the maltese cross orientation of the ribs on the kingpin maximizes the ability of the kingpin to transfer bending moments to the structural members of the trailer. The vertical edge portion of the ribs provides for welding of the kingpin at eight horizontally spaced vertically extending junctures with adjacent laterally extending structural members. In addition, weld junctures are provided along the laterally spaced longitudinally extending juncture between the horizontal plate portion of the kingpin and the lower plate of the vehicle chassis. Thus, the kingpin construction of the instant invention maximizes the weld junctures with the structural members of the chassis and therefore the strength and service capability thereof while minimizing the weight of the kingpin.

It is to be understood that the improved kingpin construction herein disclosed and described is presented for the purpose of explanation and illustration and is not intended to indicate limits of the invention the scope of which is defined by the following claims.

What is claimed is:

1. In a heavy duty over-the-road semitrailer having a pair of horizontally spaced vertically extending frame members and a horizontally extending frame member, an improved kingpin construction comprising,
    a generally horizontal plate portion welded to the horizontal frame member of said trailer, said kingpin having
    a cylindrical portion extending downwardly from said plate portion thereof, and
    a pair of intersecting generally normally oriented ribs extending vertically upwardly and diagonally between the vertically extending frame members of said trailer thereby to form a plurality of vertically extending weld junctures therewith.

2. In a heavy duty over-the-road semitrailer having a pair of horizontally spaced vertically extending frame members and a horizontally extending frame member with an aperture therein, an improved kingpin construction comprising,
    a generally rectangular plate portion seated on the horizontal frame member of said trailer,
    a cylindrical portion extending downwardly from said plate portion through the aperture in said horizontal frame member, and
    a pair of intersecting generally normally oriented ribs extending vertically upwardly and diagonally between the corners of the rectangular plate portion of said kingpin thereby to form a plurality of vertically and horizontally extending weld junctures with the vertically and horizontally extending members of said trailer frame, respectively.

References Cited by the Examiner
UNITED STATES PATENTS 1,943,735   1/1934   Linton.
2,841,415   7/1958   Black _____ 280—106
2,846,235   8/1958   Curell _____ 280—106

LEO FRIAGLIA, Primary Examiner.